(12) United States Patent
Kovach et al.

(10) Patent No.: US 9,889,508 B2
(45) Date of Patent: Feb. 13, 2018

(54) MAGNETICALLY MOUNTABLE PORTABLE DRILL ASSEMBLY

(71) Applicant: Hougen Manufacturing, Inc., Swartz Creek, MI (US)

(72) Inventors: Jonathan W. Kovach, Montrose, MI (US); Gary D. Taphouse, Owosso, MI (US); Jeffery R. Miller, Gaines, MI (US)

(73) Assignee: HOUGEN MANUFACTURING, INC., Swartz Creek, MI (US)

( * ) Notice: Subject to any disclaimer, the term of this patent is extended or adjusted under 35 U.S.C. 154(b) by 0 days.

(21) Appl. No.: 14/471,214

(22) Filed: Aug. 28, 2014

(65) Prior Publication Data

US 2016/0059321 A1    Mar. 3, 2016

(51) Int. Cl.
  *B23B 45/14*    (2006.01)
  *B23B 45/00*    (2006.01)
  *B25H 1/00*    (2006.01)

(52) U.S. Cl.
  CPC .............. *B23B 45/00* (2013.01); *B25H 1/005* (2013.01); *B25H 1/0071* (2013.01); *B23B 2260/10* (2013.01); *Y10T 408/21* (2015.01); *Y10T 408/554* (2015.01)

(58) Field of Classification Search
  CPC ... B25H 1/0071; B23B 45/00; B23B 2260/10; B23Q 17/2404; Y10T 408/554; Y10T 408/91; Y10T 408/21
  See application file for complete search history.

(56) References Cited

U.S. PATENT DOCUMENTS

| 2,440,950 A | 5/1948 | Hill |
| 2,625,785 A | 1/1953 | Meiners |
| 2,672,770 A * | 3/1954 | Buck .................... B25H 1/0071 408/135 |
| 2,820,377 A * | 1/1958 | Buck .................... B23Q 3/1543 408/135 |

(Continued)

FOREIGN PATENT DOCUMENTS

| DE | 102008003484 A1 * | 7/2009 | ............ B23B 45/00 |
| DE | 20 2013 011 818 U1 | 7/2014 | |

(Continued)

OTHER PUBLICATIONS

International Search Report for Application No. PCT/US2014/053092 dated Apr. 28, 2015, 4 pages.

(Continued)

*Primary Examiner* — Daniel Howell
(74) *Attorney, Agent, or Firm* — Howard & Howard Attorneys PLLC

(57) ABSTRACT

A magnetically mountable portable drill assembly includes a magnetic base adapted to be mountable to a working surface, a housing coupled to the magnetic base, a motor coupled to the housing, an arbor coupled to the motor for rotation by the motor, a cutter coupled to the arbor for rotation with the arbor and adapted to cut the working surface or a workpiece supported on the working surface, the magnetic base having a front surface facing the cutter, and an illuminator coupled to the magnetic base to emit light from the front surface of the magnetic base for illuminating an end of the cutter and either one of the working surface and the workpiece.

20 Claims, 8 Drawing Sheets

(56) References Cited

U.S. PATENT DOCUMENTS

| | | | |
|---|---|---|---|
| 2,821,875 A * | 2/1958 | Buck | B25H 1/0071 |
| | | | 408/234 |
| 2,887,910 A | 5/1959 | Williamson, Jr. | |
| 2,926,236 A | 2/1960 | Charton | |
| 2,932,194 A * | 4/1960 | Buck | B25H 1/0071 |
| | | | 408/234 |
| 2,941,446 A | 6/1960 | Senglet | |
| 3,044,324 A * | 7/1962 | Buck | B23Q 3/1543 |
| | | | 408/236 |
| 3,130,633 A | 4/1964 | Rantsch | |
| 3,728,027 A | 4/1973 | Watanabe | |
| 3,981,605 A | 9/1976 | Wirsing | |
| 4,012,162 A | 3/1977 | Warren | |
| 4,425,061 A | 1/1984 | Kindl et al. | |
| 4,443,137 A | 4/1984 | Albrent et al. | |
| D285,797 S | 9/1986 | Arehart | |
| 4,887,193 A | 12/1989 | Dieckmann | |
| 4,892,447 A | 1/1990 | Schmidt | |
| 5,275,517 A | 1/1994 | Turnipseed et al. | |
| 5,522,683 A | 6/1996 | Kakimoto et al. | |
| 5,902,076 A | 5/1999 | Miller et al. | |
| D421,018 S | 2/2000 | Ashkenazi | |
| D438,199 S | 2/2001 | Arpe | |
| D445,808 S | 7/2001 | Gill | |
| D446,227 S | 8/2001 | Gill | |
| D447,494 S | 9/2001 | Miller | |
| 6,328,505 B1 * | 12/2001 | Gibble | B25H 1/0092 |
| | | | 408/16 |
| 6,364,580 B1 * | 4/2002 | Dils | B25F 5/00 |
| | | | 206/379 |
| 6,443,675 B1 * | 9/2002 | Kopras | B25F 5/02 |
| | | | 144/136.95 |
| D470,868 S | 2/2003 | Welsh | |
| D472,251 S | 3/2003 | Shimada | |
| D481,379 S | 10/2003 | Nagai et al. | |
| 6,634,838 B2 | 10/2003 | Kitamura et al. | |
| D525,971 S | 8/2006 | Ayala et al. | |
| 7,164,474 B2 | 1/2007 | Arntson et al. | |
| 7,296,905 B2 | 11/2007 | Etter et al. | |
| D563,994 S | 3/2008 | Liu et al. | |
| D565,568 S | 4/2008 | Trifilio et al. | |
| D568,881 S | 5/2008 | Hsiau | |
| 7,369,916 B2 | 5/2008 | Etter et al. | |
| 7,377,202 B1 | 5/2008 | Shibata | |
| D577,750 S | 9/2008 | Kovach | |
| 7,677,752 B2 * | 3/2010 | Tadokoro | B25B 23/18 |
| | | | 362/119 |
| 7,936,142 B2 | 5/2011 | Otsuka et al. | |
| 8,011,283 B2 | 9/2011 | Takase | |
| 8,186,067 B2 | 5/2012 | Onose et al. | |
| 8,376,667 B2 | 2/2013 | Wilbert et al. | |
| 8,405,258 B2 * | 3/2013 | Schoen | H02K 7/1853 |
| | | | 310/192 |
| 8,469,531 B2 | 6/2013 | Huang | |
| 8,667,877 B2 | 3/2014 | Marinov et al. | |
| D719,196 S | 12/2014 | Burca | |
| D726,766 S | 4/2015 | Goodner | |
| 2002/0131267 A1 * | 9/2002 | Van Osenbruggen | |
| | | | B23D 59/003 |
| | | | 362/109 |
| 2005/0094386 A1 * | 5/2005 | Zhang | B23D 59/003 |
| | | | 362/119 |
| 2009/0028653 A1 | 1/2009 | Wilbert et al. | |
| 2009/0110500 A1 | 4/2009 | Miller et al. | |
| 2010/0028095 A1 | 2/2010 | Yang et al. | |
| 2010/0085730 A1 | 4/2010 | Kimble et al. | |
| 2011/0250026 A1 | 10/2011 | Lin | |
| 2012/0318113 A1 | 12/2012 | Coble | |
| 2013/0287508 A1 | 10/2013 | Timmons et al. | |
| 2014/0227054 A1 | 8/2014 | Timmons et al. | |

FOREIGN PATENT DOCUMENTS

| | | | | |
|---|---|---|---|---|
| DE | 202013011818 U1 * | 7/2014 | | B25H 1/0071 |
| JP | 2002254227 A | 9/2002 | | |
| JP | 2004009149 A | 1/2004 | | |
| WO | WO 2013122604 A1 * | 8/2013 | | B25D 5/02 |
| WO | WO2013163412 A1 | 10/2013 | | |

OTHER PUBLICATIONS

Machine-Assisted English language abstract and Machine-Assisted English language translation for DE 20 2013 011 818 extracted from espacenet.com database on May 7, 2015, 21 pages.

English language abstract and machine-assisted English translation for JP2002254227 extracted from espacenet.com database on Dec. 3, 2014, 6 pages.

English language abstract and machine-assisted English translation for JP2004009149 extracted from espacenet.com database on Dec. 3, 2014, 5 pages.

* cited by examiner

MAGNETICALLY MOUNTABLE PORTABLE DRILL ASSEMBLY

BACKGROUND OF THE INVENTION

1. Field of the Invention

The present invention relates generally to portable drill assemblies mountable to a working surface and, more particularly, to a magnetically mountable portable drill assembly mountable to a working surface.

2. Description of the Related Art

Magnetically mountable portable drill assemblies (mag-drills) are used extensively in the metal fabricating field for forming holes in various working surfaces or workpieces supported on the working surfaces where it is either impractical or inconvenient to move the workpiece or the working surface to a conventional drill press. Typically, magnetically mountable portable drill assemblies have an arbor coupled to a motor which is attached to a slide assembly. The slide assembly is mounted for vertical movement in relation to a magnetic base. A cutter is coupled to the arbor and a handle is typically used to rotate a gear which rectilinearly moves the slide assembly between a retracted position and an extended position to form a hole in a workpiece or working surface. Thus, to drill a hole, the entire motor, arbor, slide, and cutter must be slidably actuated in a vertical plane relative to the magnetic base.

Drilling a precision hole in a substantial workpiece or working surface such as a steel I-beam, pipe or plate, requires a relatively powerful electrical motor to maintain an acceptable rate of operation. Due to the strength and precision required to moveably support the entire motor, arbor, slide, and cutter, the drill assembly is relatively bulky and difficult to maneuver along a workpiece or working surface.

Accordingly, as the magnetically mountable portable drill assembly is moved to the workpiece or working surface, it is advantageous to provide the most portable and compact drill assembly possible. Additionally, as the drill assembly is operated in a construction environment, it is preferable that the drill assembly have a minimum number of exposed parts. The minimization of exposed parts improves the durability and the maintenance requirements of the drill assembly.

It is known to provide illumination for the magnetically mountable portable drill assembly. Typically, a light is mounted to an outer surface of the drill assembly. However, when the light is mounted above an upper end of the cutter of the drill assembly, it will cast a shadow where a pilot of the cutter meets the working surface. In addition, when the light is mounted to the outer surface of the drill assembly, it is susceptible to damage and interfere with positioning the drill assembly in tight spaces.

It is, therefore, desirable to provide a magnetically mountable portable drill assembly that has a light mounted below a cutting end of a cutter when the cutter is in a retracted position to provide better illumination during operation. It is also desirable to provide a magnetically mountable portable drill assembly that has a light mounted to a magnetic base. It is further desirable to provide a magnetically mountable portable drill assembly that has a light that is not exposed externally to allow the drill assembly to be mounted in tight spaces. It is still further desirable to provide a magnetically mountable portable drill assembly having a light which is compact, has a minimum number of exposed parts and is of a relatively light weight.

SUMMARY OF THE INVENTION

Accordingly, the present invention is a magnetically mountable portable drill assembly. The magnetically mountable portable drill assembly includes a magnetic base adapted to be mounted to a working surface, a housing coupled to the magnetic base, a motor coupled to the housing, an arbor coupled to the motor for rotation by the motor, and a cutter coupled to the arbor for rotation with the arbor and adapted to cut either the working surface or a workpiece supported on the working surface. The magnetic base has a front surface facing the cutter. The magnetically mountable portable drill assembly also includes an illuminator coupled to the magnetic base to emit light from the front surface of the magnetic base for illuminating an end of the cutter and either the working surface and/or the workpiece.

One advantage of the present invention is that a magnetically mountable portable drill assembly provides illumination during drilling. Another advantage of the present invention is that the magnetically mountable portable drill assembly integrates an illuminator into a magnetic base so that it becomes part of the magnetic base. Yet another advantage of the present invention is that the magnetically mountable portable drill assembly integrates the illuminator on a front surface of the magnetic base near or below a cutting end of the cutter in a retracted position to prevent casting a shadow where a pilot of the cutter meets the working surface. A further advantage of the present invention is that the magnetically mountable portable drill assembly includes the illuminator disposed within the magnetic base such that the illuminator is not susceptible to damage and interference with positioning the drill assembly in tight spaces. Yet a further advantage of the present invention is that the magnetically mountable portable drill assembly includes the illuminator within the magnetic base, making the drill assembly compact with a minimum number of exposed parts and is of a relatively light weight.

Other features and advantages of the present invention will be readily appreciated, as the same becomes better understood, after reading the subsequent description taken in conjunction with the accompanying drawings.

DETAILED DESCRIPTION OF THE PREFERRED EMBODIMENT(S)

Figure 1:
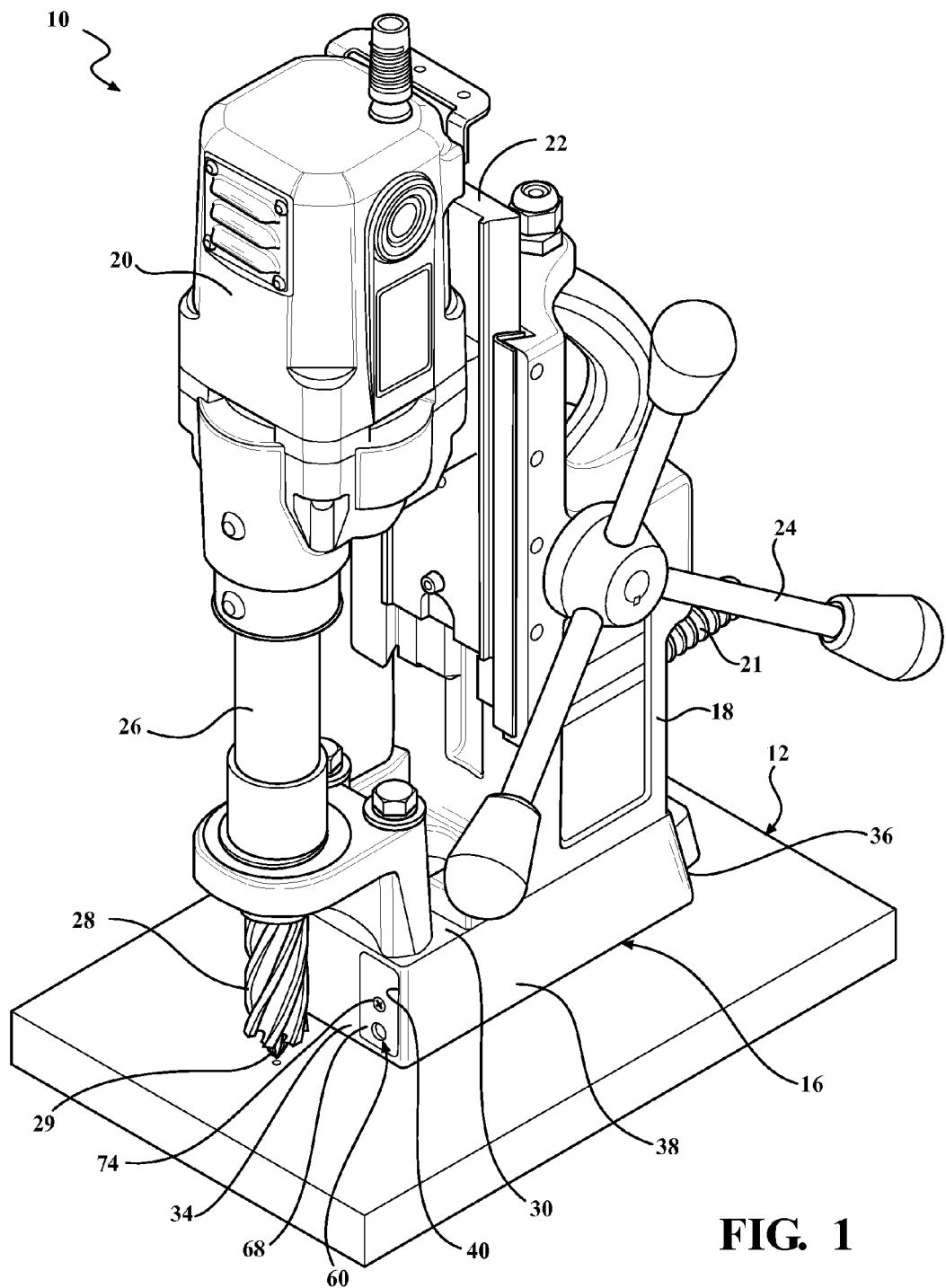
FIG. 1 is a perspective view of one embodiment of a magnetically mountable portable drill assembly, according to the present invention, mounted to a working surface.
Figure 2:
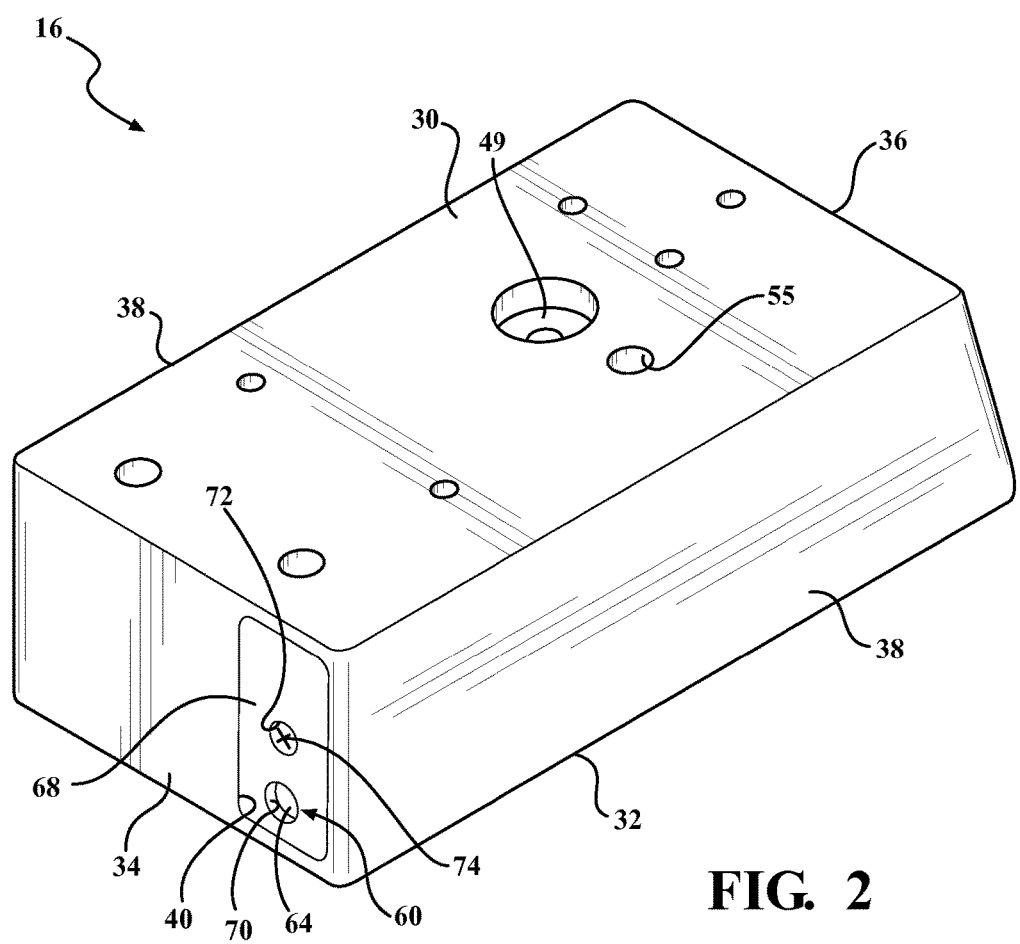
FIG. 2 is a perspective view of a magnetic base of the magnetically mountable portable drill assembly of FIG. 1.

Referring to the figures, wherein like numerals indicate like parts throughout the several views, one embodiment of a magnetically mountable portable drill assembly, according to the present invention, is shown generally at 10. The magnetically mountable portable drill assembly 10 is configured to mount to a working surface, generally indicated at 12. As illustrated in FIG. 1, the working surface 12 is generally rectangular in shape, but may be any suitable shape, and is made of a ferromagnetic material such as steel. The magnetically mountable portable drill assembly 10 is mounted and secured to the working surface 12 by magnetic attraction therebetween. It should be appreciated that the working surface 12 may be a workpiece or a workpiece may be supported on the working surface 12. It should also be appreciated that the work surface 12 illustrated in FIG. 1 is not intended to limit the scope of the present invention. It should further be appreciated that the magnetically mountable portable drill assembly 10 may be used with various other types of working surfaces, not specifically shown herein, without departing from the scope of the present invention.

Referring to FIGS. 1 through 5, the magnetically mountable portable drill assembly 10 includes a magnetic base 16 for magnetically engaging the working surface 12 and a support platform or housing 18 mounted to the magnetic base 16. The magnetically mountable portable drill assembly 10 also includes an electric motor 20 coupled to the housing 18. The magnetically mountable portable drill assembly 10 includes a power module (not shown) disposed within the housing 18 and electrically connected to the motor 20 and an electrical cord 21 connected to the power module to connect to a power source such as an AC power source. The AC power source may be a conventional 120V or 240V power source. The magnetically mountable portable drill assembly 10 also includes a control switch (not shown) connected to the power module to control the supply of power to the motor 20 from the power module. It should be appreciated that the housing 18 and the motor 20 are generically depicted in the Figures and the housing 18 and motor 20 can be of any type.

The magnetically mountable portable drill assembly 10 also includes a slide assembly 22 coupled to the motor 20 and the housing 18 and a gear (not shown) rotatably coupled to the housing 18 to engage the slide assembly 22 for vertical rectilinear movement of the motor 22. The magnetically mountable portable drill assembly 10 further includes a rotatable handle 24 coupled to the gear that is actuated by a user to rotate the gear and vertically actuate or move the motor 20. It should be appreciated that the slide assembly 22, gear, and handle 24 are conventional and known in the art.

The magnetically mountable portable drill assembly 10 further includes an arbor 26 coupled to the motor 20 for rotation by the motor 20. The arbor 26 defines a bore (not shown). The magnetically mountable portable drill assembly 10 includes a cutter 28 having an upper end partially inserted into the bore and coupled to the arbor 26. The cutter 28 partially extends from the bore to a lower cutting end for cutting the workpiece or working surface 12, which is typically formed from a rigid material such as metal. The lower cutting end may have a pilot 29 extending axially therefrom. The cutter 28 rotates with the arbor 26 relative to the housing 18 to cut a hole in the workpiece or working surface 12. For example, the cutter 28 is sized to cut holes sized between 7/16-2⅜ inches in diameter and 1-3 inches deep. It should be appreciated that the size of the holes can be any size without departing from the nature of the present invention.

Referring to FIGS. 1 through 6, the magnetic base 16 is generally rectangular in shape, but may be any suitable shape. The magnetic base 16 has a top surface 30, a bottom surface 32 opposing the top surface 30, a front surface 34 extending between the top surface 30 and bottom surface 32, a rear surface 36 opposing the front surface 34 and extending between the top surface 30 and bottom surface 32, and opposed side surfaces 38 extending between the top surface 30 and bottom surface 32 and between the front surface 34 and rear surface 36. As illustrated, the magnetic base 16 has an opening 40 in the front surface 34. In one embodiment, the opening 40 is generally rectangular in shape, but may be any suitable shape. The opening 40 extends inwardly a distance to receive a cover or plate 68 to be described. The magnetic base 16 also has a cavity 42 extending inwardly from the opening 40. As illustrated, the cavity 42 is generally rectangular in shape, but may be any suitable shape to receive an illuminator 60 to be described. The magnetic base 16 has a ledge 44 in the cavity 42 and a duct 46 extending from the cavity 42 to receive wiring (not shown). The magnetic base 16 further has a threaded aperture 48 extending inwardly from the opening 40 and spaced vertically above the cavity 42 to receive a fastener 74 to be described. The magnetic base 16 has the side surfaces 38 that are continuous or uninterrupted such that the side surfaces 38 are free of any mounted components. It should be appreciated that the magnetic base 16 is attached to the housing 18 by at least one fastener (not shown) extending through an aperture 49 in the top surface 30 of the magnetic base 16.

The magnetic base 16 also has a chamber 50 extending upwardly or inwardly from the bottom surface 32. In one embodiment, the chamber 50 has a general "8" shape. The magnetic base 16 also includes a winding assembly, generally indicated at 52, to generate a magnetic field. The winding assembly 52 includes at least one winding or copper bobbin 54 disposed in the chamber 50. In the embodiment illustrated, the winding assembly 52 includes a pair of copper bobbins 54 disposed in the chamber 50. The magnetic base 16 also includes at least one wire (not shown) for powering the winding assembly 52. The wire is disposed in the chamber 50 and the duct 46 and connected to the copper bobbins 54 and extends through an aperture 55 in the top surface 30 for electrically connecting the magnetic base 16 to the housing 18 to receive power from the power module within the housing 18. The magnetic base 16 may include an insert 56 for securing the winding assembly 52 in the chamber 50. The magnetic base 16 is solid and made of a non-magnetic material. The magnetic base 16 is integral, unitary, and one-piece. It should be appreciated that the winding assembly 52 may be electrically connected to the control switch or another source of power other than the power module. It should also be appreciated that the magnetic base 16 may include one or more apertures (not labeled) for wires or fasteners (not shown). It should further be appreciated that, when the winding assembly 52 receives power, the magnetic base 16 is magnetized to mount and secure the drill assembly 10 to the working surface 12 via a magnetic filed generated by the winding assembly 52.

Figure 3:
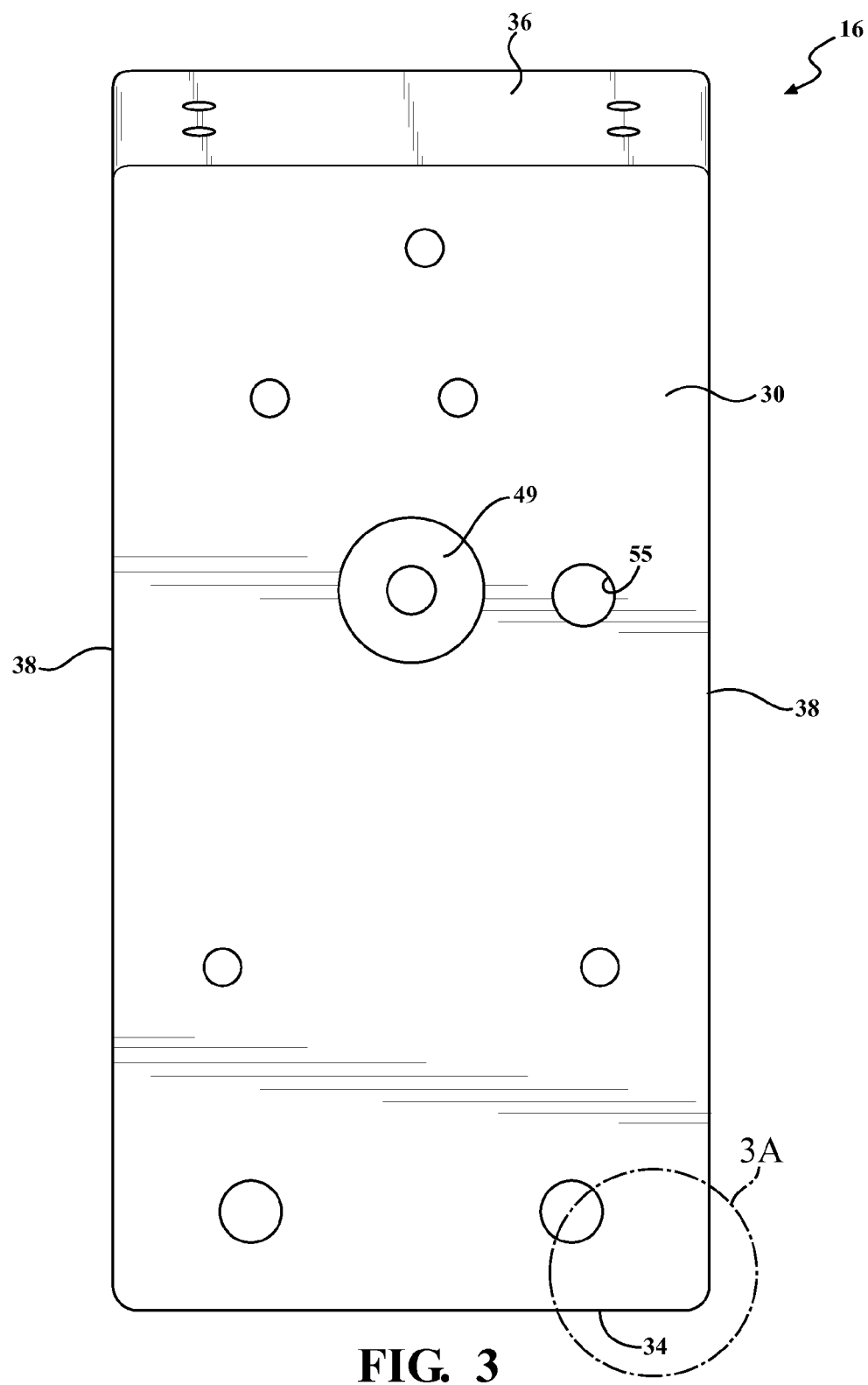
FIG. 3 is a top view of the magnetic base of FIG. 2.
Figure 3A:
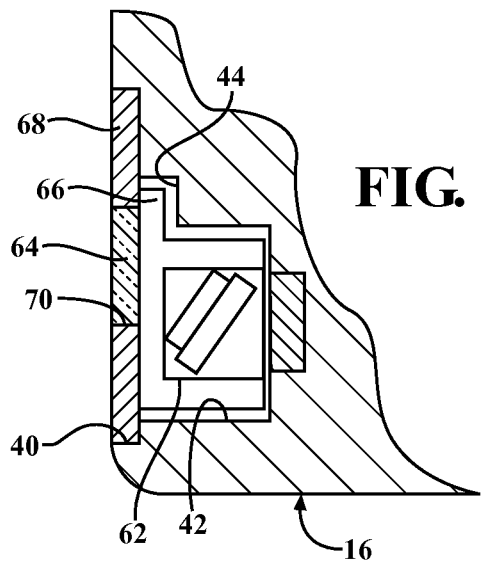
FIG. 3A is a fragmentary top view of a portion of the magnetic base in circle 3A of FIG. 3 illustrated in a first operational state.
Figure 3B:
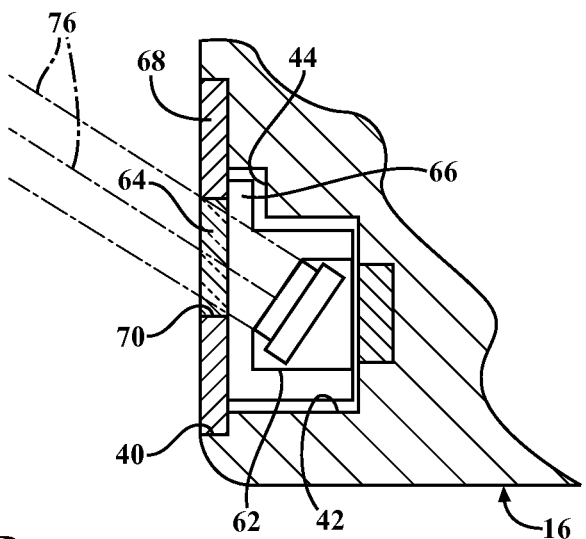
FIG. 3B is a view similar to FIG. 3A illustrated in a second operational state.
Figure 3C:
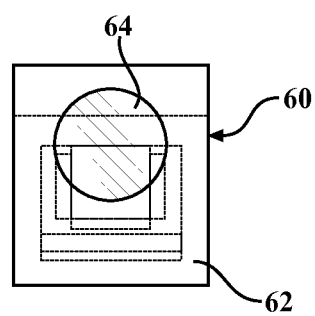
FIG. 3C is a front elevational view of the portion of FIG. 3A.
Figure 4:
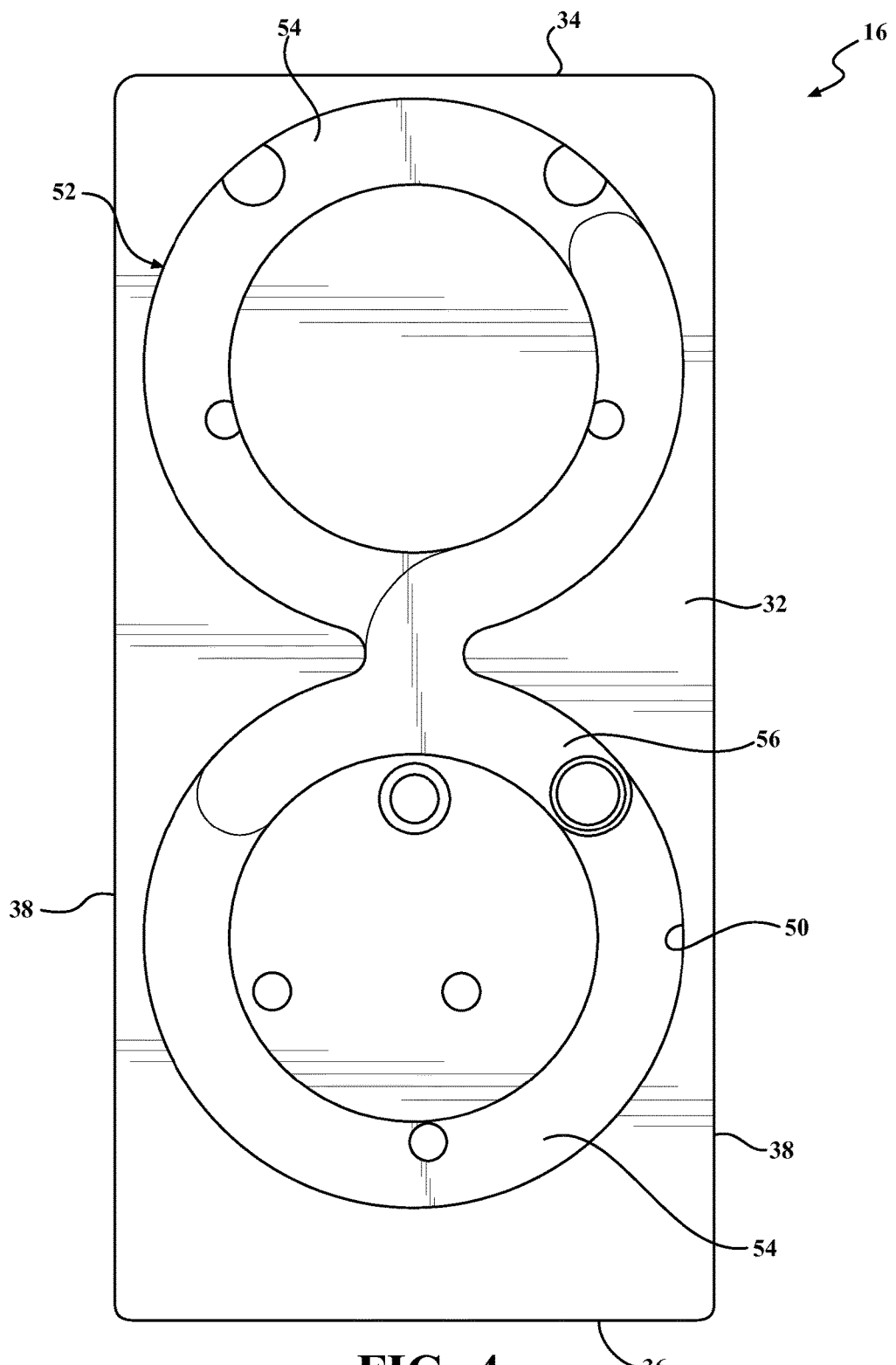
FIG. 4 is a bottom view of the magnetic base of FIG. 2.
Figure 5:
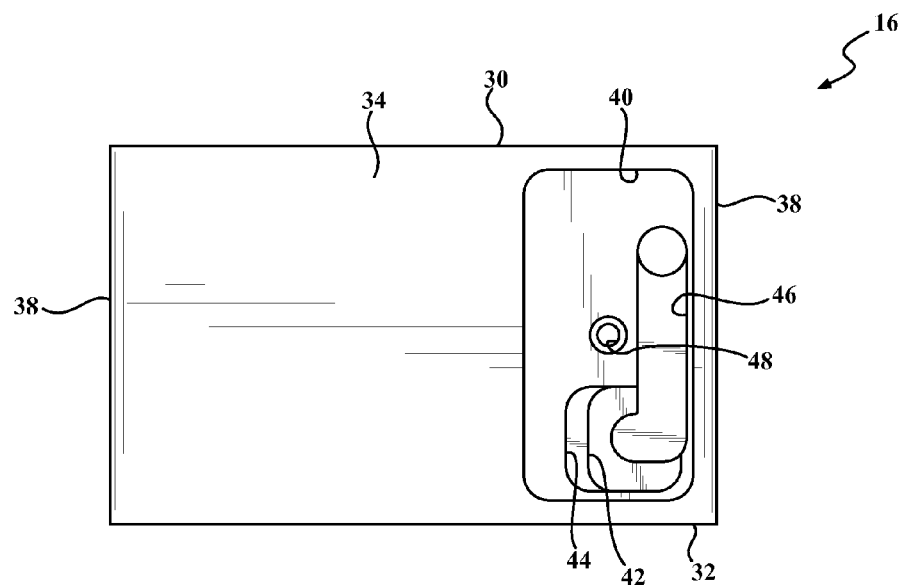
FIG. 5 is a front elevational view of the magnetic base of FIG. 2 illustrated with a plate and illuminator removed.
Figure 6:
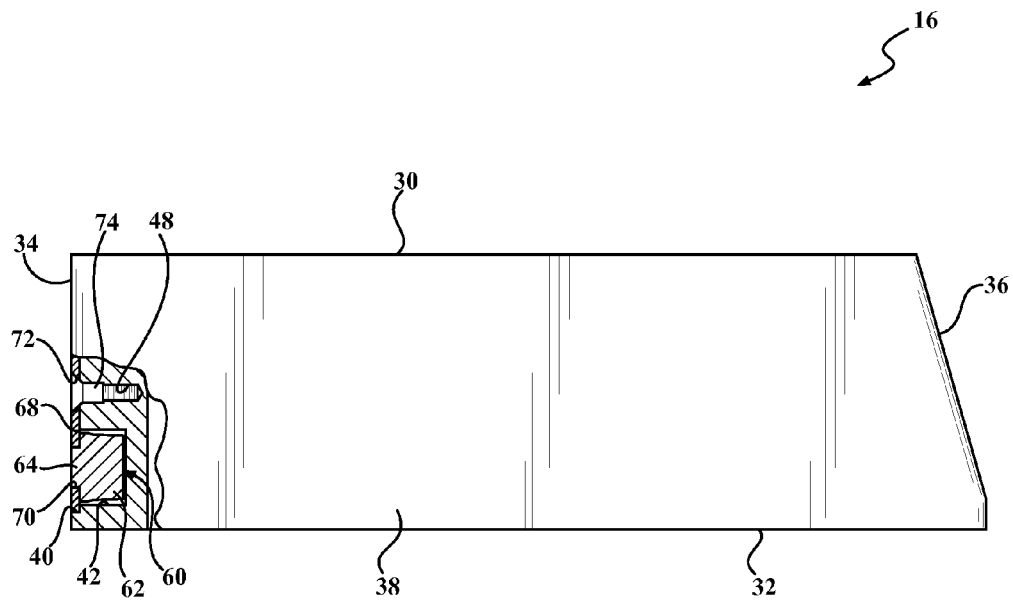
FIG. 6 is a side fragmentary elevational view of the magnetic base of FIG. 2.
Figure 7:
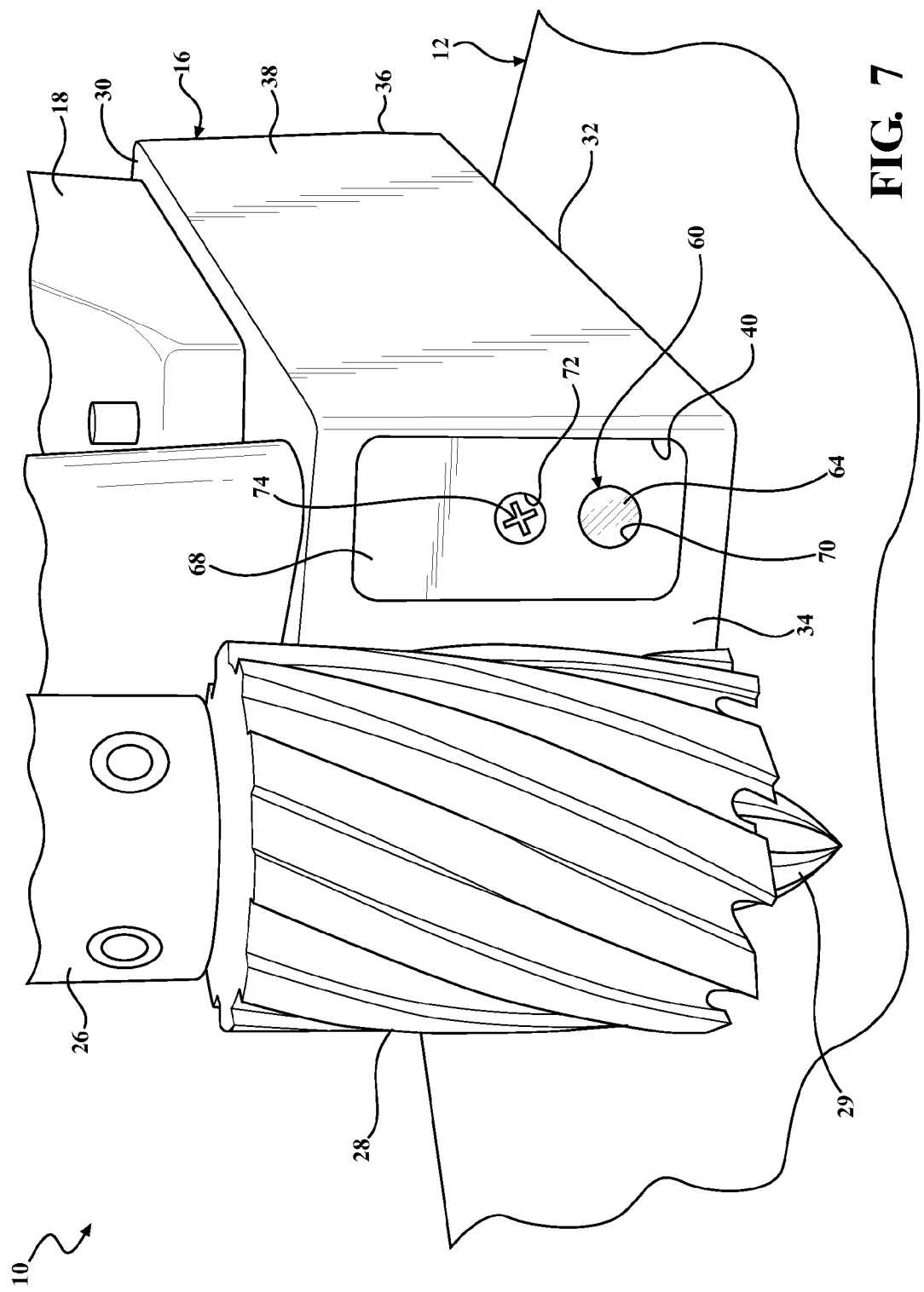
FIG. 7 is a perspective view of a portion of the magnetically mountable portable drill assembly of FIG. 1 illustrated in a first operational state.

As illustrated in FIGS. 1 through 8, the magnetically mountable portable drill assembly 10 also includes an illuminator, generally indicated at 60, coupled to the magnetic base 16. In one embodiment, the illuminator 60 has a light source 62 and a lens 64 for concentrating light from the light source 62. In one embodiment, the light source 62 is of an LED type. The lens 64 is a polycarbonate material, but may be any suitable material. The lens 64 may be fully or partially transparent. The light source 62 is at least partially disposed in the cavity 42 of the magnetic base 16. In one embodiment, the light source 62 is disposed within the cavity 42 with the lens 64 disposed in the opening 40. The illuminator 60 may have a protrusion 66 extending from the light source 62 for overlapping the ledge 44. In one embodiment, the light source 62 is angled with respect to the front surface 34 of the magnetic base 16 toward the cutter 28 as illustrated in FIGS. 3A through 3C. In the embodiment illustrated, the illuminator 60 is fixed to the magnetic base 16. In another embodiment, the illuminator 60 is movable relative to the magnetic base 16. It should be appreciated that the illuminator 60 is disposed axially below the cutter 28 when the cutter 28 is in a retracted position relative to the working surface 12 to emit light from the front surface 34 of the magnetic base 16 for illuminating the cutting end of the cutter 28, the working surface 12, and/or the workpiece without casting a shadow of the cutting end of the cutter 28 on at least one of the working surface 12 and/or the workpiece.

The magnetically mountable portable drill assembly 10 further includes a plate 68 for attachment to the magnetic base 16. In the embodiment illustrated, the plate 68 is generally rectangular in shape, but may be any suitable shape to mate with the opening 40. The plate 68 at least partially covers the opening 40. In the embodiment illustrated, the plate 68 covers the entire opening 40. The plate 68 has an aperture 70 extending therethrough to allow light to be projected or emitted from the light source 62 therethrough. In one embodiment, the lens 64 is disposed in the aperture 70. The plate 68 has a thickness approximately equal to the distance or thickness of the opening 40 such that an outer surface of the plate 68 is flush with the front surface 34 of the magnetic base 16. The plate 68 has an aperture 72 extending therethrough to receive a fastening mechanism such as a fastener 74 to secure the plate 68 to the magnetic base 16. The fastener 72 threadably engages the threaded aperture 48. The plate 68 is made of a metal material, but may be made of any suitable material. It should be appreciated that the protrusion 66 of the illuminator 60 is sandwiched between the ledge 44 and the plate 68 for securing and aligning the light source 62 in the cavity 42.

Figure 8:
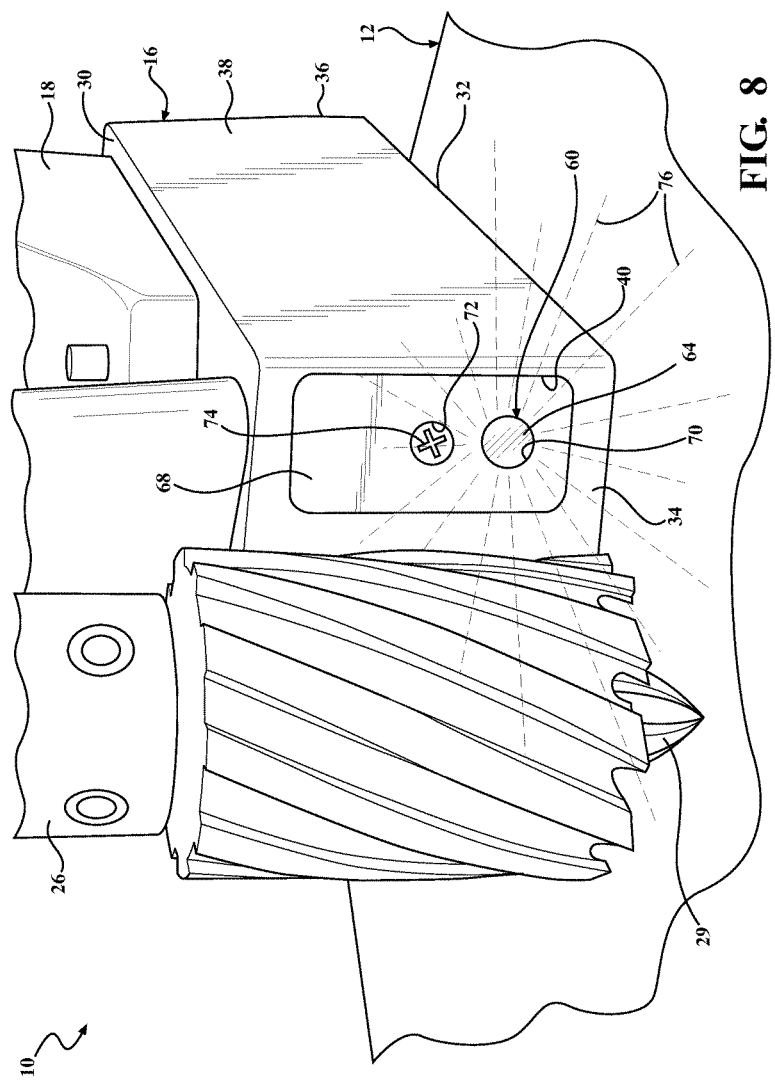
FIG. 8 is a view similar to FIG. 7 illustrated in a second operational state.

In operation, the magnetically mountable portable drill assembly 10 is disposed on the working surface 12 as illustrated in FIG. 1. The user operates the control switch to provide power to the winding assembly 52 to generate a magnetic field to magnetically mount and secure the drill assembly 10 to the working surface 12. The motor 22 rotates about a drive axis and rotates the arbor 26. At the same time, the arbor 26 causes the cutter 28 to rotate. The slide assembly 22 is in a raised or retracted position. Power is also provided to the illuminator 60 to illuminate the cutting end of the cutter 28, the working surface 12, and/or the workpiece without casting a shadow of the cutting end of the cutter 28 on at least one of the working surface 12 and the workpiece as illustrated in FIG. 8. The rotatable handle 24 is actuated by a user to rotate the gear and vertically lower the motor 20, arbor 26, and cutter 28 toward the working surface 12 in an extended position to cut a hole in the workpiece or working surface 12. It should be appreciated that the illuminator 60 provides generally illumination and is not a laser to locate a center point for cutting or drilling.

Accordingly, the magnetically mountable portable drill assembly 10 of the present invention provides illumination during drilling. The magnetically mountable portable drill assembly 10 of the present invention integrates the illuminator 60 into the magnetic base 16 so it becomes part of the magnetic base 16. The magnetically mountable portable drill assembly 10 of the present invention also integrates the illuminator 60 on the front surface 34 of the magnetic base 16 and below the top surface 30 of the magnetic base 16 to prevent casting a shadow where the pilot meets the working surface 12 or the workpiece. The magnetically mountable portable drill assembly 10 of the present invention includes the illuminator 60 disposed within the magnetic base 16 such that it is not susceptible to damage and interference with positioning the drill assembly 10 in tight spaces. The magnetically mountable portable drill assembly 10 of the present invention also includes the illuminator 60 within the magnetic base 16 such that the drill assembly 10 is compact, has a minimum number of exposed parts and is of a relatively light weight.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A magnetically mountable portable drill assembly comprising:
a magnetic base adapted to be mounted to a working surface;
a housing coupled to said magnetic base;
a motor coupled to said housing;
an arbor coupled to said motor for rotation by said motor;
a cutter coupled to said arbor for rotation with said arbor and adapted to cut either one of the working surface and a workpiece supported on the working surface;
said magnetic base having a front surface facing said cutter;
an illuminator coupled to said magnetic base to emit light from said front surface of said magnetic base for illuminating an end of said cutter and either one of the working surface and the workpiece;
a planar plate coupled to said front surface of said magnetic base and having a first aperture extending therethrough to allow passage of emitted light and a second aperture extending therethrough and spaced from said first aperture; and
a fastener extending through said second aperture of said plate to secure said plate to said magnetic base.

2. A magnetically mountable portable drill assembly as set forth in claim 1 wherein said illuminator includes a light source.

3. A magnetically mountable portable drill assembly as set forth in claim 2 wherein said light source is an LED light.

4. A magnetically mountable portable drill assembly as set forth in claim 2 wherein said light source emits light at an angle with respect to said front surface of said magnetic base toward said cutter.

5. A magnetically mountable portable drill assembly as set forth in claim 1 wherein said magnetic base has an opening in said front face and a cavity extending inwardly from said opening.

6. A magnetically mountable portable drill assembly as set forth in claim 5 wherein said illuminator is at least partially disposed in said cavity.

7. A magnetically mountable portable drill assembly comprising:
a magnetic base adapted to be mounted to a working surface;
a housing coupled to said magnetic base;

a motor coupled to said housing;
an arbor coupled to said motor for rotation by said motor;
a cutter coupled to said arbor for rotation with said arbor and adapted to cut either one of the working surface and a workpiece supported on the working surface;
said magnetic base having a front surface facing said cutter;
an illuminator coupled to said magnetic base to emit light from said front surface of said magnetic base for illuminating an end of said cutter and either one of the working surface and the workpiece;
said magnetic base having an opening in said front face and a cavity extending inwardly from said opening;
a plate at least partially covering said opening; and
wherein said magnetic base defines a ledge in said cavity and wherein said illuminator has a protrusion such that said protrusion is sandwiched between said ledge and said plate for securing and aligning said illuminator in said cavity.

8. A magnetically mountable portable drill assembly comprising:
a magnetic base adapted to be mounted to a working surface;
a housing coupled to said magnetic base;
a motor coupled to said housing;
an arbor coupled to said motor for rotation by said motor;
a cutter coupled to said arbor for rotation with said arbor and adapted to cut either one of the working surface and a workpiece supported on the working surface;
an illuminator disposed within said magnetic base to emit light from said magnetic base for illuminating an end of said cutter and either one of the working surface and the workpiece; and
a planar plate flush with an outer surface of said magnetic base and having a first aperture extending therethrough to allow passage of emitted light and a second aperture extending therethrough and spaced from said first aperture;
a lens disposed in said first aperture of said plate; and
a fastener extending through said second aperture of said plate to secure said plate to said magnetic base.

9. A magnetically mountable portable drill assembly as set forth in claim 8 wherein said illuminator includes a light source.

10. A magnetically mountable portable drill assembly as set forth in claim 9 wherein said light source is an LED light.

11. A magnetically mountable portable drill assembly as set forth in claim 9 wherein said light source emits light at an angle with respect to an outer surface of said magnetic base toward said cutter.

12. A magnetically mountable portable drill assembly as set forth in claim 8 wherein said magnetic base has an opening in an outer surface and a cavity extending inwardly from said opening.

13. A magnetically mountable portable drill assembly comprising:
a magnetic base adapted to be mounted to a working surface;
a housing coupled to said magnetic base;
a motor coupled to said housing;
an arbor coupled to said motor for rotation by said motor;
a cutter coupled to said arbor for rotation with said arbor and adapted to cut either one of the working surface and a workpiece supported on the working surface;
said magnetic base having a front surface facing said cutter;
a light source coupled to said magnetic base to emit light from said front surface of said magnetic base for illuminating an end of said cutter and either one of the working surface and the workpiece; and
wherein said magnetic base defines a ledge in said cavity and wherein said light source has a protrusion such that said protrusion is sandwiched between said ledge and a plate for securing and aligning said illuminator in said cavity.

14. A magnetically mountable portable drill assembly comprising:
a magnetic base adapted to be mounted to a working surface;
a housing coupled to said magnetic base;
a motor coupled to said housing;
an arbor coupled to said motor for rotation by said motor;
a cutter coupled to said arbor for rotation with said arbor and adapted to cut either one of the working surface and a workpiece supported on the working surface;
said magnetic base having a front surface facing said cutter and a threaded aperture extending into said front face;
an illuminator coupled to said front surface and disposed within said magnetic base including a light source to emit light from said front surface for illuminating the end of said cutter, the working surface, and the workpiece;
a planar plate disposed flush with said front surface of said magnetic base and having a first aperture extending therethrough to allow passage of emitted light and a second aperture extending therethrough and spaced from said first aperture;
a lens disposed in said first aperture of said plate; and
a fastener extending through said second aperture of said plate and threadably engaging said threaded aperture of said magnetic base to removably fasten said plate to said magnetic base.

15. A magnetically mountable portable drill assembly as set forth in claim 14 wherein said magnetic base has an opening in said front face and a cavity extending inwardly from said opening.

16. A magnetically mountable portable drill assembly as set forth in claim 15 wherein said illuminator is at least partially disposed in said cavity.

17. A magnetically mountable portable drill assembly comprising:
a magnetic base adapted to be mounted to a working surface;
a housing coupled to said magnetic base;
a motor coupled to said housing;
an arbor coupled to said motor for rotation by said motor;
a cutter coupled to said arbor for rotation with said arbor and adapted to cut either one of the working surface and a workpiece supported on the working surface;
said magnetic base having a front surface facing said cutter;
an illuminator coupled to said magnetic base and disposed axially below said cutter when said cutter is in a retracted position relative to the working surface to emit light from said front surface of said magnetic base for illuminating an end of said cutter and either one of the working surface and the workpiece without casting a shadow of the cutting end of the cutter on at least one of the working surface and/or the workpiece;
a planar plate coupled to said front surface of said magnetic base and having a first aperture extending therethrough to allow passage of emitted light and a second aperture extending therethrough and spaced from said first aperture;

a lens disposed in said first aperture of said plate; and a fastener extending through said second aperture of said plate to secure said plate to said magnetic base.

18. A magnetically mountable portable drill assembly as set forth in claim 17 wherein said illuminator includes a light source.

19. A magnetically mountable portable drill assembly as set forth in claim 18 wherein said light source is an LED light.

20. A magnetically mountable portable drill assembly as set forth in claim 18 wherein said light source emits light at an angle with respect to said front surface of said magnetic base toward said cutter.

* * * * *